UNITED STATES PATENT OFFICE.

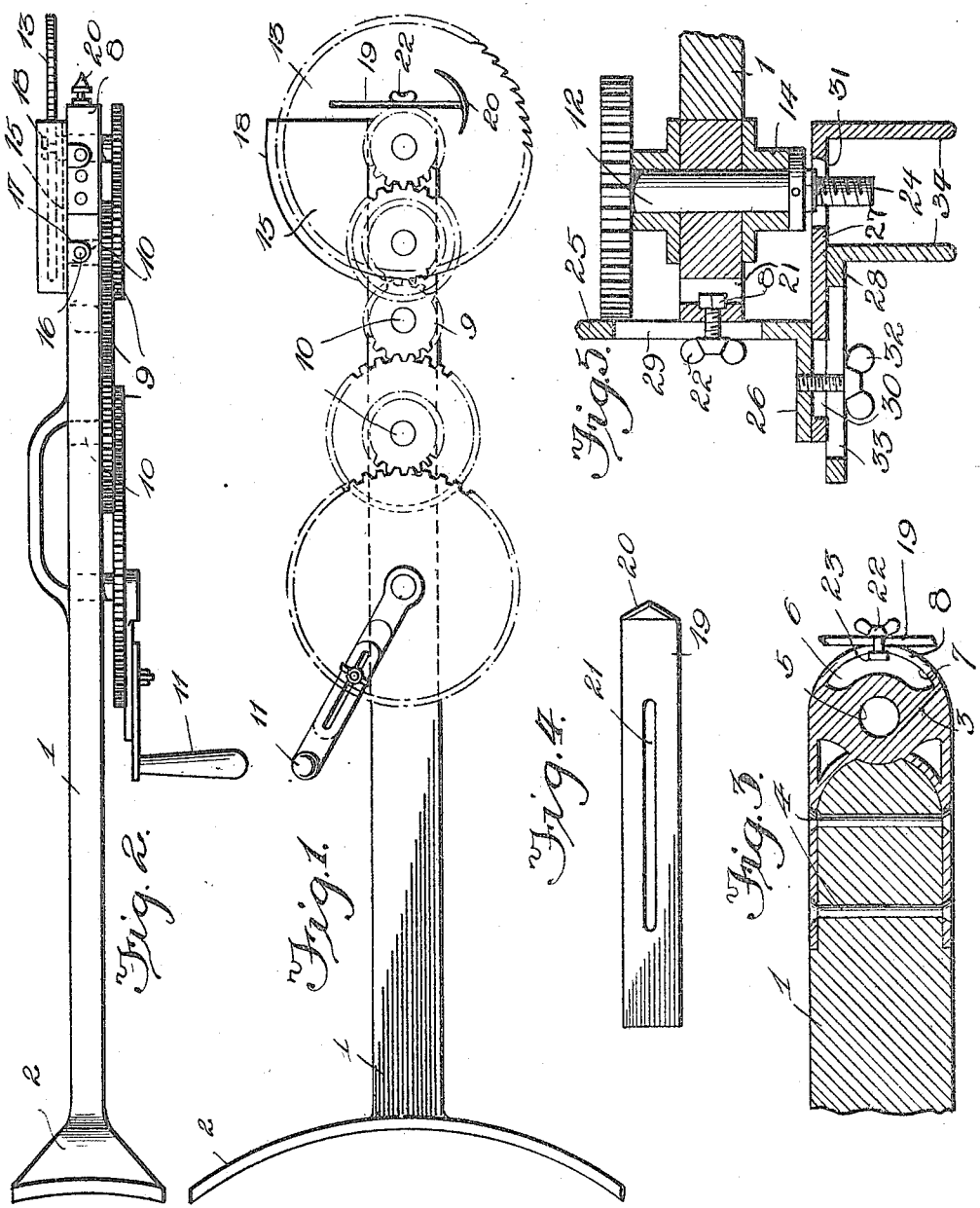

GEORGE R. BURGESS, OF TACOMA, WASHINGTON.

SAW.

1,136,181.     Specification of Letters Patent.     Patented Apr. 20, 1915.

Application filed September 17, 1913. Serial No. 790,261.

*To all whom it may concern:*

Be it known that I, GEORGE R. BURGESS, a citizen of the United States, residing at Tacoma, in the county of Pierce and State of Washington, have invented certain new and useful Improvements in Saws; and I do hereby declare the following to be a full, clear, and exact description of the invention, such as will enable others skilled in the art to which it appertains to make and use the same.

This invention comprehends improvements in hand saws, and relates more particularly to those of the circular type.

One of the objects of the invention is to provide a saw of this nature which shall be of extremely simple construction, cheap to manufacture and capable of being driven at a very high speed.

Another and more specific object of the invention is to provide a circular saw having a novel form of gage and constructed to permit the removal of the saw and the substitution of a bit.

With these and other objects in view, as will become more apparent as the description proceeds, the invention consists in certain novel features of construction, combination and arrangement of parts, as will be hereinafter fully described and claimed.

For a complete understanding of my invention, reference is to be had to the following description and accompanying drawings, in which—

Figure 1 is a side elevation of my improved saw, Fig. 2 is an edge view thereof, Fig. 3 is a fragmentary longitudinal sectional view through the outer end of the saw frame, Fig. 4 is a detail of the saw gage, Fig. 5 is a fragmentary sectional view through the outer end of the saw frame, showing the form of gage used when a bit is substituted for the saw.

Referring in detail to the drawings by numerals, 1 designates the saw frame, which is in the form of a rigid bar, to one end of which is secured a rest 2 for engagement with the body of the operator and to the other end of which is secured a casting, generally designated 3. This casting is connected to the frame by means of suitable fasteners 4, is formed with a transverse bearing opening 5, and a recess 6, said recess having an arcuate outer wall 7 formed with a slot 8.

A train of increase speed gearing, designated by the numeral 9, is secured to one side of the saw frame along the line of its longitudinal center, by means of the stud shafts 10. The large innermost gear carries a crank handle 11, whereby said gear may be rotated to impart motion to the remaining gears. The outermost gear is rigidly secured adjacent to one end of the arbor 12, and a circular saw 13 is removably secured to the other end of the arbor. Guide bearings 14 are carried upon the frame and surround the arbor 12.

A somewhat quadrant shaped saw guard 15 is secured to one edge of the frame 1, by means of suitable fasteners 16 fastening through ears 17 formed upon the guard. This guard carries upon its peripheral edge a laterally projecting flange 18 which partially surrounds the periphery of the saw 13.

To regulate the depth to which the saw will cut, I provide a gage including a straight bar 19 having a curved contact head 20 formed upon one end thereof. The bar is formed with a longitudinal slot 21 and is secured in position by means of a set screw 22 and nut 23. The screw passes through the slot 21 and through the slot 8 formed in the wall 7 of the casting 3. It will be seen that the gage may be adjusted longitudinally and may also be adjusted angularly with respect to the frame by shifting the screw 22 through the slot 8.

When it is desired to use the device for boring, the saw is removed and a bit may be connected to the threaded end 24 of the arbor 12, in any suitable manner. When using a bit, the saw gage is removed and a different form of gage substituted in its place. This last mentioned gage comprises an attaching plate 25 having a lateral projection 26 formed upon one end thereof, and the plates 27 and 28. The attaching plate is formed with a longitudinal slot 29 through which the said screw 22 passes, and the plate 27 is formed with a longitudinal slot 30 and an opening 31. A wing screw 32 passes through the slot 30 and through a somewhat longer slot 33 formed in the plate 28, and threads into the extension 26 of the attaching plate. The plates 27 and 28 are provided with the parallel guide portions 34 which are disposed upon opposite sides of the arbor 12 and which extend at right angles to the main portions of the plates.

It will be seen that this gage is capable of various adjustments and will serve to hold the bit in the center of a piece of work, such as a door, when boring to form a mortise to receive the lock.

While I have shown and described the preferred embodiment of my invention, it will be understood that minor changes in construction, combination and arrangement of parts may be made without departing from the scope and spirit of the invention as claimed.

Having thus described my invention, I claim:—

1. In a saw of the character described, a frame, a casting rigidly secured to one end thereof, said casting being formed with a bearing opening and a recess, the outer wall of the recess being curved and longitudinally slotted, an arbor extending through the bearing opening, a tool carried by said arbor, means for rotating the arbor, a gage including a straight bar, having a curved head on one end thereof, the bar being longitudinally slotted; and attaching means passing through the slotted bar and through the slotted wall of the casting to secure the gage in position.

2. In a device of the character described, a frame, a casting secured to one end thereof and formed with a bearing opening and a recess, the outer wall of the recess being curved and longitudinally slotted, an arbor extending through the bearing opening, said arbor being adapted to rotate a tool, a gage secured to said slotted wall and including a body portion having an angular extension adjacent one end thereof; said body portion being slotted and means to secure the body portion to the slotted wall inserted through the slot in the body and wall and adjustingly securing said body.

In testimony whereof I affix my signature in presence of two witnesses.

GEORGE R. BURGESS.

Witnesses:
MARTIN PAULSEN,
ERIC WM. YOUNG.

Copies of this patent may be obtained for five cents each, by addressing the "Commissioner of Patents, Washington, D. C."